United States Patent [19]
Bunin

[11] Patent Number: 5,392,966
[45] Date of Patent: Feb. 28, 1995

[54] FLUID DISPENSING DEVICE WITH GRAVITY-FILL CONTINUOUSLY VARIABLE DOSAGE SELECTION

[75] Inventor: Leonid Bunin, Woodbridge, N.J.

[73] Assignee: Merck & Co., Inc., Rahway, N.J.

[21] Appl. No.: 182,269

[22] Filed: Jan. 18, 1994

[51] Int. Cl.⁶ ............................................. G01F 11/26
[52] U.S. Cl. .................................. 222/454; 222/472;
    222/484; 222/434; 222/509; 222/48
[58] Field of Search ............... 222/282, 292, 454, 455,
    222/456, 472, 473, 484, 439, 438, 509, 434, 48

[56] References Cited

U.S. PATENT DOCUMENTS

| | | | |
|---|---|---|---|
| 2,413,136 | 12/1946 | Burger | 222/282 |
| 2,760,692 | 8/1956 | Buehlig | |
| 3,006,506 | 10/1961 | Germano | 222/439 X |
| 3,045,878 | 7/1962 | Blanford et al. | 222/473 |
| 3,141,585 | 7/1964 | Emmert | |
| 3,223,295 | 12/1965 | Falerni et al. | |
| 3,419,187 | 12/1968 | Bazarnic | |
| 4,214,679 | 7/1990 | Whang | |
| 4,474,312 | 10/1984 | Donoghue | |
| 4,690,313 | 9/1987 | Luine et al. | |
| 4,828,149 | 5/1989 | Hester | |
| 5,119,971 | 6/1992 | Reyman | |
| 5,165,576 | 11/1992 | Hickerson | 222/484 X |
| 5,174,478 | 12/1992 | Reyman | |

FOREIGN PATENT DOCUMENTS

0335505  10/1989  European Pat. Off.

*Primary Examiner*—Gregory L. Huson
*Attorney, Agent, or Firm*—Hesna J. Pfeiffer; Mark R. Daniel

[57] ABSTRACT

A device is provided for controlled dispensing of a variable measured quantity of fluid from a container. The device has a dosage cup chamber adapted to hold a measured quantity of fluid when the container is inverted and righted. This fluid is then dispensed from the chamber through a valved conduit.

4 Claims, 3 Drawing Sheets

FLUID DISPENSING DEVICE WITH GRAVITY-FILL CONTINUOUSLY VARIABLE DOSAGE SELECTION

BACKGROUND OF THE INVENTION

U.S. Pat. No. 5,174,478 to Reyman provides for a device for controlled dispensing of a measured quantity of fluid from a flexible container.

U.S. Pat. No. 4,747,521 (Saffrin) provides a pour-on device for one delivery of a measured quantity of liquid. An infinitely variable version of the latter device is provided in EPO Patent 0,335,505 Saffrin & MacCartney.

U.S. Pat. No. 3,581,853 to Donoghue provides for a single dose dosage cup situated on a squeeze bottle containing a fluid to be dispensed. U.S. Pat. No. 4,143,794 to Stratford et. al., provides for a squeeze bottle with a dosage cup within which resides an extension of the dip tube of a squeeze bottle and a dose determining means whereby a series of holes are provided for in the extension and the dose determining means, and the rotation of the dose determining means causes the holes to be selectively aligned so that discrete doses can be provided.

The instant invention is an improvement over the prior art in providing for the controlled dispensing of a continuously variable selection of dose volumes.

SUMMARY OF THE INVENTION

This invention is concerned with an improvement in the dispensing of fluid materials from a bottle whereby the gravity-fill dose is selected is variable over a continuous range of dosages. Thus, it is an object of the instant invention to describe the bottle for dispensing fluids through a gravity-fill continuously variable dosage cup. It is a further object to describe the functioning of the gravity-fill dosage cup to provide for the continuous selection of dose volumes within the dosage cup. Further objects will become apparent from a reading of the following description.

DESCRIPTION OF THE INVENTION

This invention provides for an improved device for dispensing variable volumes of fluids, generally as liquids, although occasionally as flowable powders, from a container. These devices are particularly suited for the dispensing of liquid or powdered medicaments to be topically applied to animals or concentrated medicaments for further dilution and administration to a number of animals but could equally well be used for the dispensing of oral liquid medicaments for animals or humans. Further uses could include the dispensing of liquid fertilizers, insecticides, fungicides or weed killers for agricultural uses or detergents, waxes, or oils for household uses.

The present invention provides a unique and novel solution to the problem of accurately measuring and dispensing predetermined amounts of a liquid material from Conventional containers. The invention comprises a device for dispensing a measured quantity of fluid from a supply of said fluid, the device including a bottle container and means for providing a gravity-filled, measured amount of fluid for discharge from the device. This means is further adapted to fit the container and is provided with a chamber adapted to hold the amount of fluid, which can be variable over a continuous range of dosages.

Accordingly, this invention provides an improved dosing device for fluids which provides for a reservoir of fluid material in a bottle having a fluid dispensing cap affixed. This dispensing cap is also the dosage cup.

The adjustable dosage cup alone is old, see EPO Patent 0,335,505. An extension in fluid connection with the contents of the bottle leads to and is within the dosage cup, the extension being constructed with a sidewall having a top surface of a generally (helical) curved shape of increasing height. A downwardly projecting bottom column in the cap is provided which is in slidable engagement with the extension, and which has one or two slots which will enable fluid to pass therethrough. The slot(s) in the column are generally oriented lengthwise along the column with an upper end and a lower end such that the upper end is higher within the dosage cup than the lower end. The extension and downwardly projecting column are generally cylindrical in shape. The upper end of the extension and the lower end of the column can be slightly smaller than the opposite ends to facilitate manufacture and provide good surface contact.

The slot(s) in the column and the extension are oriented such that when the column and extension are in slidable engagement with each other the slot(s) intersect within extension to expose a fluid opening. The column is rotatable between positions to continuously vary the selection of the point of the intersection to cause the orifice to vary its height within the dosage cup.

The continuously variable height of the orifice allows for a continuously variable volume of liquid to be selected by rotating the column between positions which expose the aperture at a minimum height or a maximum height and continuously there-between within the dosage cup. The fluid is placed in the dosage cup by inverting the bottle. The fluid will flow into the dosage cup orifice which had been previously selected for its height within the dosage cup by rotating the column. The fluid will flow through the orifice and into the dosage cup until the fluid reaches the level of the orifice. This will be the desired dose. When the bottle is righted, excess fluid, or fluid above the height of the orifice will flow back through the orifice until the level of the fluid is at the height of the orifice. Then air will be drawn into the bottle to replace the fluid removed. In such a manner, when a particular dosage is selected, the volume in the dosage cup will always be exactly determined in a continuous manner between the maximum and minimum dosages provided.

The dosages are determined within the dosage cup by the intersection helical top surfaced of the extension with the slots on the column.

The extension may be constructed to fit inside or outside of the column with the column extending substantially to the bottom of the inside of the dosage cup. It is preferred to have the column contact the bottom of the cup, either inside or outside of the extension since such an arrangement provides for a better fluid seal between the inside of the extension and downwardly projecting column and the inside of the cup. The fluid seal of the bottom of the downwardly projection column is improved by ensuring that firm contact is made between the bottom surface of the downwardly projecting column and the top surface of the bottom of the cup, or the top surface of a flange situated in the bottom of the cup. One way to ensure such contact is to manufacture the downwardly projecting column so that it is slightly longer than the depth of the cup. In this manner when the cup is installed on the dosage cup, the slightly longer length of the downwardly projected column, coupled with the inherent flexibility of the plastic materials of which the dosage dispensing device is constructed, will ensure that pressure is exerted on the contact surface of the downwardly projecting column and the bottom surface or flange in the cup, thus providing for an efficient seal. The longer length of the downwardly projecting column is preferably to the extent of from 0.1 to 1.0 mm.

By providing for an efficient seal at the contact surface of the bottom of the downwardly projecting column and the top surface of the inside bottom surface or flange of the cup, the tolerances of the sidewall contact surfaces of the extension and the downwardly projecting column can be lessened. Such an arrangement is preferred since the larger surface areas of the sidewall contact surfaces would provide for greater frictional resistance to the rotation of the cap and downwardly projecting column about the extension. Greater facility of rotation of the cap is provided for with an efficient seal arrangement of the bottom of the downwardly projecting column with the top surface or flange at the inside bottom of the cup.

The dosage cup will also be fitted with a cap which contains a valved dispensing spout with which to eject the selected dose from the cup. It is further beneficial if the cup is fitted with a vent to permit air to enter the cup at the same time that the fluid material is being ejected from the dispensing spout.

In a preferred embodiment, the valve and valve seat are located at the bottom end of the dosage cup. The valve can be a radially arranged about a vertical axis or shift which extends through an opening in the upper end of this dosage cup. When the valve is displaced up vertically from its valve seat by means of a trigger or similar displacement mechanism, the vertical shaft also moves up and through the opening in the upper end of the dosage cup. The shaft is sized so that this movement creating the vent in this opening when the valve shaft is up, but the opening is closed when the valve shaft is down, and the valve is seated.

The cap of the dispensing cup is preferably integral with the downwardly projecting column is order to facilitate the rotation of the column about the extension. Other arrangements could involve the upper end of the downwardly projecting column to project through the cap and allow the rotation of the column independently of the cap. The integral arrangement of the column and cap is preferred because of simplicity of construction and the leverage and finer level of control which is gained with such an arrangement. Further, the cap can, in conjunction with the outside of the dosage cup, be fitted with a pointer and scale to assist in the accurate determination of the dosage to be selected.

The invention may be performed in various ways and preferred embodiments of the invention will now be described, by way of example, with reference to the accompanying drawings.

Figure 1:
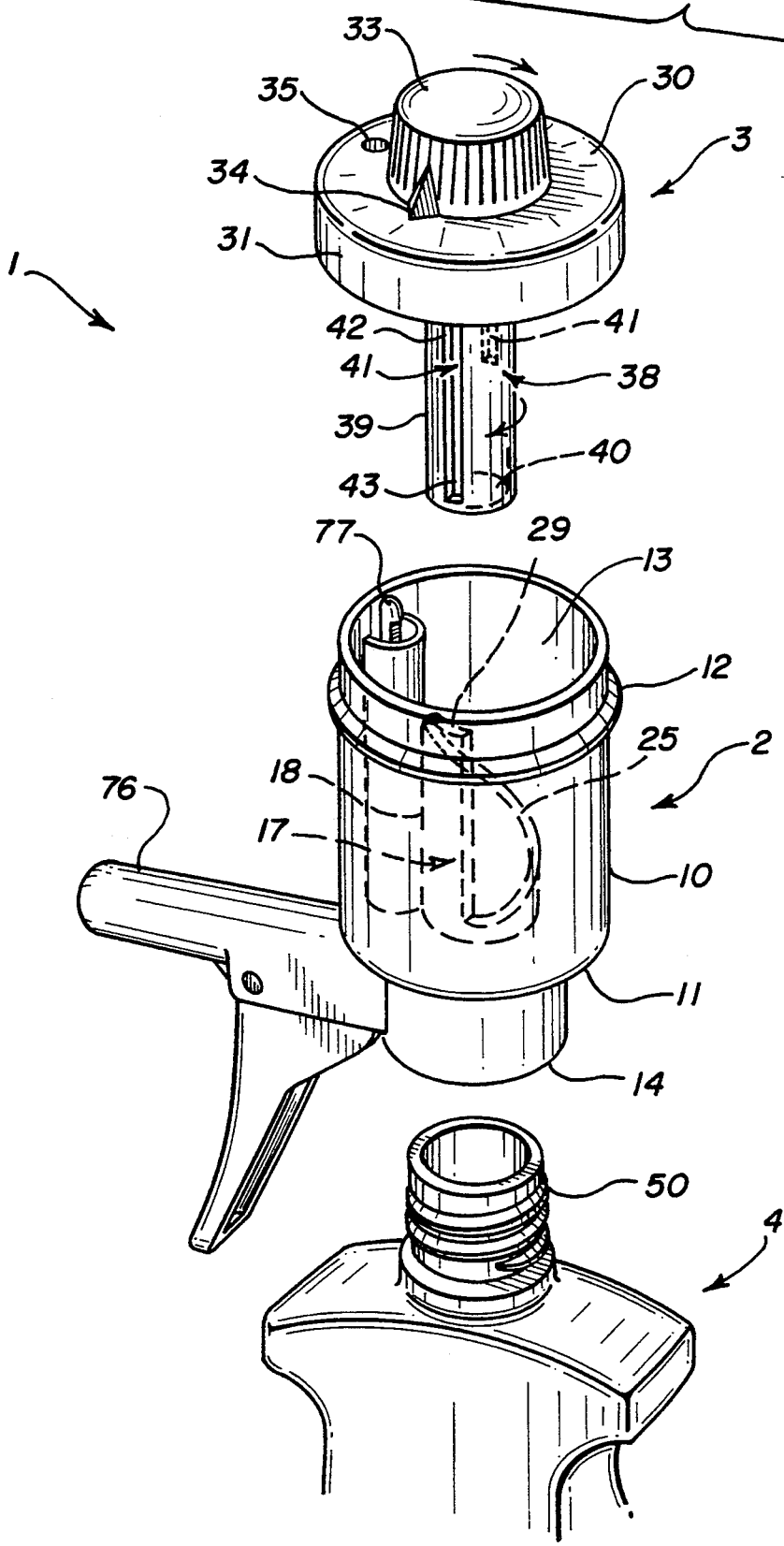
FIG. 1 is an exploded perspective view of the fluid dispensing device showing the fluid container, the dispensing cup and the dose determining means, and the valve means.
Figure 2:
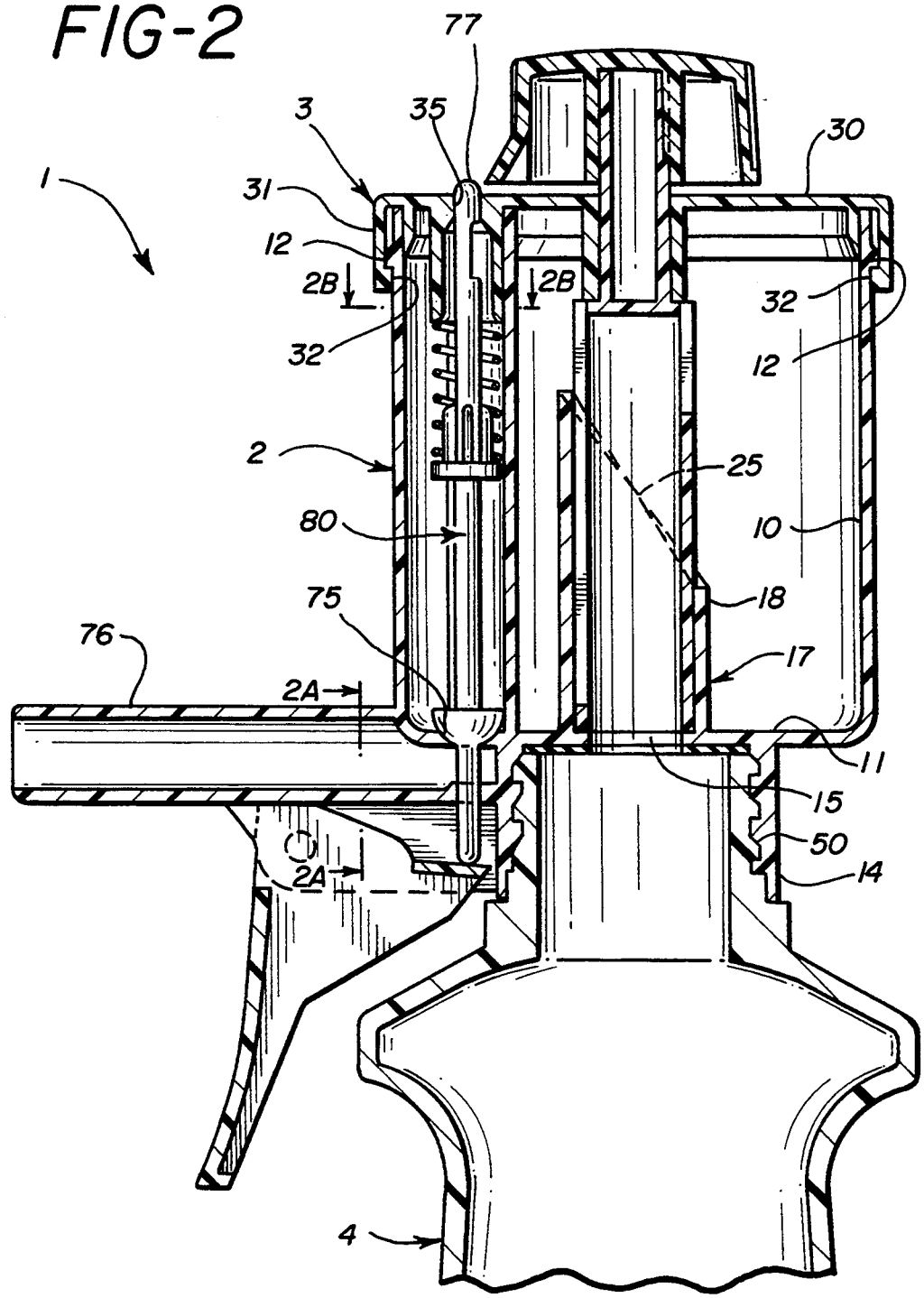
FIG. 2 is a cross-section of the fluid dispensing device, assembled and installed on the fluid container.
Figure 2A:
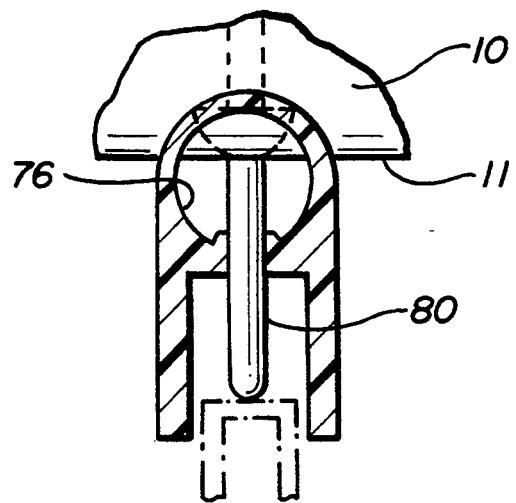
FIG. 2A is a cross-section taken along lines 2A—2A of FIG. 2.
Figure 2B:
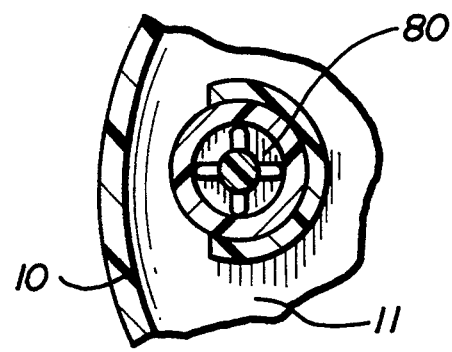
FIG. 2B is a cross-section taken along line 2B—2B of FIG. 2.
Figure 2C:
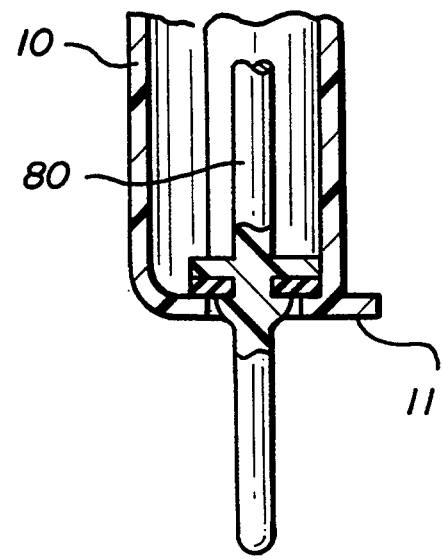
FIG. 2C is a partial cross-section of an alternative valve design.

Referring specifically to FIGS. 1 and 2, the complete fluid dispensing device 1, is shown in greater detail, comprising a dosage cup assembly 2, fitted with a cap assembly 3. The dosage cup assembly 2, is in threaded engagement with the fluid container 4.

The dosage cup assembly 2 comprises a sidewall 10 with a bottom wall 11 enclosing a space 13. The sidewall 10 is affixed with attachment means 12 for engaging the cap assembly 3. Preferably the attachment means 12 are formed on the outside of sidewall 10. The bottom wall 11 is integrally formed on the outside thereof with threaded attachment means 14 for engagement with corresponding threaded attachment means 50 on the fluid container 4.

The bottom wall 11 is also fitted with two openings 15 and 75. Opening 15 is in direct communication with the contents of container 4. Opening 75 communicates with dispensing spout 76.

The opening 15 in the bottom wall 11 of the dispensing cup assembly 2 is fitted on the inside thereof with an extension 17. The extension 17 consists of a sidewall 18 which has a top surface 29 in a generally curved shape of increasing height within the dispensing cup assembly 2. The top surface 25 of the extension 17 generally forms a helical curve along the sidewall 18 of the extension 17 and completes up to one revolution about the sidewall 18. If the top surface 25 of the extension 17 completes less than one revolution of a helix about the sidewall 18, a non-curved portion 29 of the top surface 25 may result.

The cup assembly 3 contains a downwardly projecting hollow shaft column 38 with a one or two slots 41, an opening 40 at the bottom thereof, and the outside diameter of the downwardly projecting column 38 is substantially the same as the inside diameter of the sidewall 18 of the extension 17.

When the cup assembly 3 is installed on the dispensing cup assembly 2, generally the downwardly projecting hollow shaft 38 fits within the extension 17 and the slot 41 intersects the top surface 25 of the extension at a point determined by the degree of rotation of the cap assembly 3 about the dispensing cap assembly 2. When the fluid container is inserted, fluid passes through the opening 15, into the extension 17, and out the slot(s) 41 to the extent such slot extends higher than the top surface 25. When the fluid returns to the fluid container 4, the fluid below the intersection of the top surface 25 with the slot(s) 41 is retained in the dispensing cup assembly 2 for subsequent dispensing.

The cap assembly 3 consists of a top portion 30 with a circumferential sidewall 31 attached to the top portion 30 at the outer edge thereof. The inside of the downwardly projecting sidewall 31 has locking means 32 for engagement with the corresponding locking means 12 on the outer wall 10 of the dispensing cup assembly 2. Since the cap assembly 3 is designed to rotate about a vertical axis about the dispensing cup assembly, continuous circumferential locking means on either the sidewall 10 or the downwardly projecting sidewall 31 is preferred. In order to reduce the hoop strength of the locking means 12 and 32 during assembly, it may be advantageous to manufacture one of the locking means in a non-continuous or interrupted fashion. This would facilitate the mating of the two locking means 12 and 32. The upper knob portion 33 is directly connected to 38.

The upper knob portion 33 also contains a volume or dosage indicator 34 which will indicate the dosage selected by its alignment with a series of volume indicators on the top surface 30 of cap 3. In addition to volume, the dosage could be indicated in the size or weight of animals which are to be treated with a particular volume of fluid. Where the contents of the container are in a concentrated form, the indicators could define the number of animals treated with a particular volume of fluid.

The top portion 30 is also fitted with an orifice 35 through which have shaft 77 of the valve assembly 80 protrudes.

The cap assembly 3 is either fitted with or is integral with a downwardly projecting hollow shaft 38 which consists of a substantially cylindrical sidewall 39 which is open or has an opening 40 at the bottom edge thereof. The outside diameter of the downwardly projecting column 39 is substantially the same as the inside diameter of the extension 17.

The downwardly projecting column is also fitted with one or two slots 41 therethrough which is generally vertically arranged in the cylindrical sidewall and which has an upper end 42 and a lower end 43. When the cap assembly 3 is affixed to the dispensing cup assembly 2, the downwardly projecting column 38 is fitted snugly about the extension 17.

After filling, the fluid in the dispensing cup assembly 2 is removed therefrom by opening valve 80 to allow the fluid to pass through the opening 75 and dispensing spout 76.

The fluid dispensing device may be made of plastic materials suitable for injection molding such as polyethylene or polypropylene which should be inert to the fluid materials which are intended to be dispensed. The use of such injection molding resins will provide for the inexpensive and facile manufacture of the dosing device, yet will still provide for the dimensional accuracy which is required for some applications. Further, since the containers upon which the instant caps are installed may be refilled with fluid from a large stock container, the use of such materials will provide for the durability necessary for such prolonged operation.

What is claimed is:

1. A dose measuring device for fluids which comprises a dosage cup in fluid communication with a container, the container having an extension situated within the dosage cup, the extension being constructed to enable fluid to pass into the dosage cup through the extension where the extension is provided with a top surface allowing fluid to pass over said top surface where said top surface rises from a low point to a high point within the dosage cup; and a downwardly projecting column from the cap of the dosage cup in slidable engagement with the extension, said downwardly projecting column provided with a one or more slots allowing fluid to pass therethrough, said slot(s) having a lower end and an upper end wherein the slot(s) is oriented along the downwardly projecting column to connect the lower end with the upper end, with the top surface of the extension and the slot(s) in the downwardly projecting column placed in an angular and intersecting arrangement with each other when the downwardly projecting column and the extension are slidable engaged and the downwardly projecting column is movable between positions for an infinitely variable selection of intersection points of the top surface of the extension and the slot(s) of the downwardly projecting column to expose a continuously varying length of the upper portion of the slot(s) within the dosage cup allowing fluid to pass from the container when the container is inverted and righted, into the dosage cup and return of any excess fluid through the exposed upper portion of the groove and into said downwardly projecting column and valved means, including a valve and valve seat, operated by a trigger to upwardly displace the valve from its valve seat to eject the fluid dose from the dosage cup after righting the container operated by a trigger to upwardly displace the valve from its valve seat.

2. The dose measuring device of claim 1 wherein the top surface of the extension is helical in shape.

3. The dose measuring device of claim 1 wherein the lowest point of the top surface of the extension is situated near the bottom of the dosage cup and the highest point of the top surface of the extension is situated near the top of the dosage cup.

4. The dose measuring device of claim 1 wherein the inside diameter of the extension is substantially the same as the outside diameter of the downwardly projecting column.

* * * * *